F. PFLEUMER.
VEHICLE WHEEL.
APPLICATION FILED JUNE 1, 1914.
1,258,042.
Patented Mar. 5, 1918.
2 SHEETS—SHEET 1.
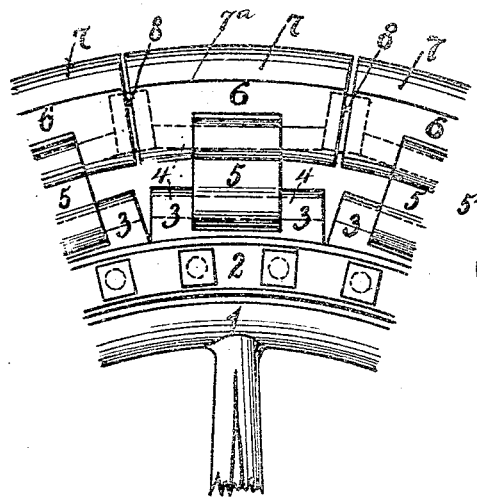
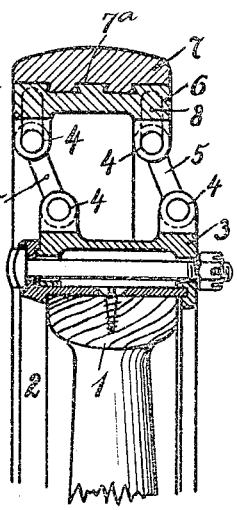
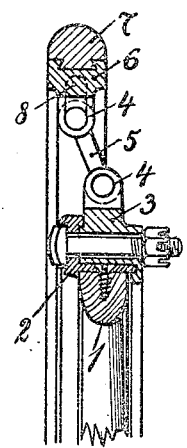
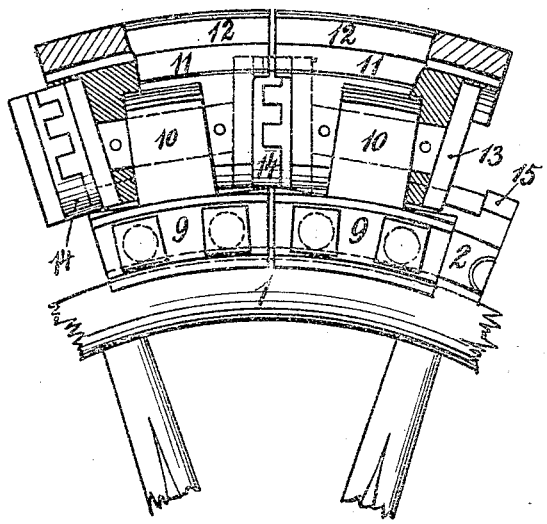
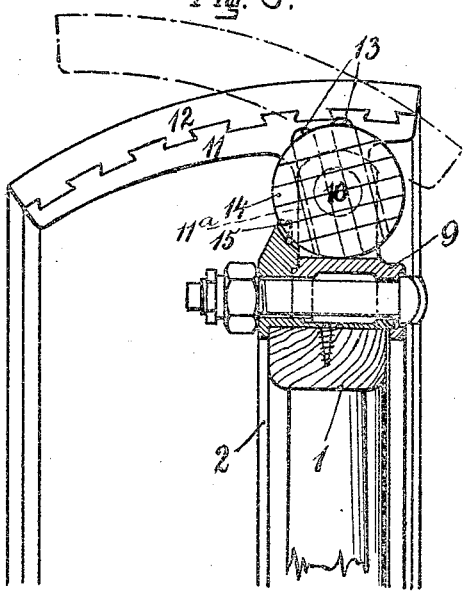
Witnesses
Inventor
Fritz Pfleumer,
By
Atty.

F. PFLEUMER.
VEHICLE WHEEL.
APPLICATION FILED JUNE 1, 1914.
1,258,042.
Patented Mar. 5, 1918.
2 SHEETS—SHEET 2.
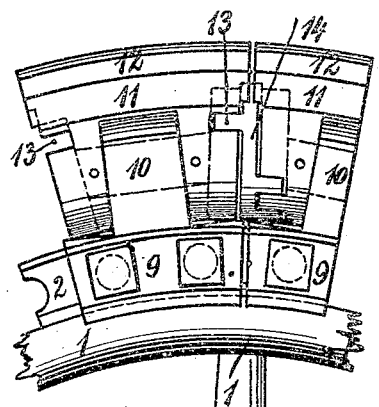
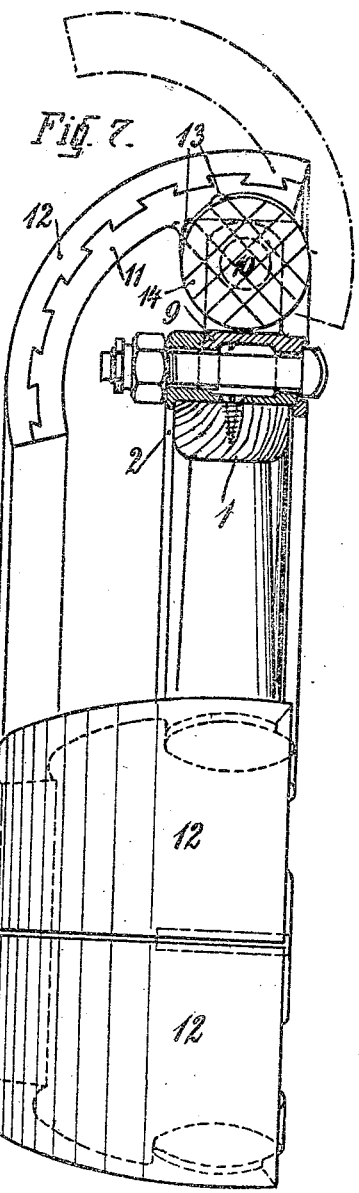
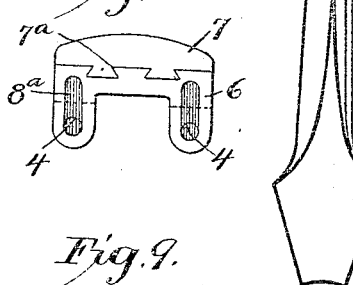
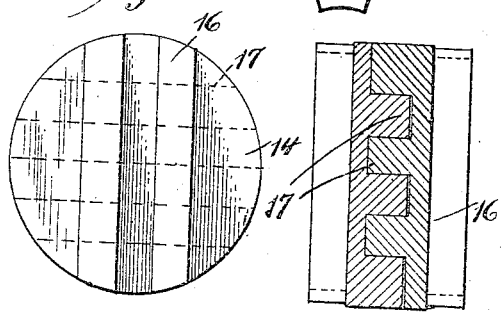
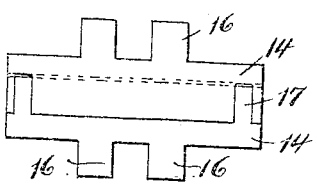
Witnesses
Inventor
Fritz Pfleumer,
By John Steward,
Att'y.

UNITED STATES PATENT OFFICE.

FRITZ PFLEUMER, OF DRESDEN, GERMANY.

VEHICLE-WHEEL.

1,258,042.  Specification of Letters Patent.  Patented Mar. 5, 1918.

Application filed June 1, 1914. Serial No. 841,975.

*To all whom it may concern:*

Be it known that I, FRITZ PFLEUMER, engineer, a subject of the Emperor of Austria, and a resident of 48 Marienstrasse, Dresden-A., in the Empire of Germany, have invented certain new and useful Improvements in and Relating to Vehicle-Wheels, of which the following is a specification.

This invention relates to vehicle wheels and has for its object to provide an improved construction of wheels of this character in which the centrifugal force due to the rotation of the wheel is utilized in such a manner that the axle of the wheel and the vehicle carried thereby are resiliently supported.

According to the present invention the centrifugal force due to the rotation of the wheel is utilized for exerting a resilient lifting power upon the wheels and consequently upon the axles carrying them.

The invention is illustrated in the accompanying drawings of which—

Figure 1 is a view in side elevation of a portion of a wheel constructed in accordance with the invention, Figs. 2 and 3 being cross-sectional views of a wheel with a broad rim and a wheel with a small rim respectively.

Figs. 4 and 6 are views similar to Fig. 1, but illustrating modified constructions, Figs. 5 and 7 being cross-sectional views of the constructions shown in Figs. 4 and 6 respectively.

Fig. 8 is an end view of a tread section according to Fig. 2 and Figs. 9, 10 and 11 represent in front view, cross section and plan view respectively the coupling pieces shown in Figs. 4 to 7.

Referring now first to the construction shown in Figs. 1, 2 and 3, the rim 2 is secured to the felly 1 composed of wood or other suitable material. Mounted upon the rim 2 are a number of segments 3 secured to the rim in any suitable manner as for instance by means of bolts and nuts. Each of the rim segments 3 is provided with a set of links 5, provided with trunnions 4 and serving to connect the rim segments to corresponding outer segments 6 forming the tread of the wheel, and each of which is provided with a tire or face segment 7 composed of india-rubber or other suitable material which are connected together by a dovetail joint 7ª or in other suitable manner. The several outer segments 6 are arranged to be connected to one another by means of keys 8 located in grooves or recesses 8ª in the end faces of the segments the keys 8 serving to transmit the centrifugal force of all the outer segments of the wheel to that segment which for the time being is in contact with the ground and is therefore supporting the full load on the wheel.

The advantage of this arrangement is that since the centrifugal force of all the segments of the wheel can be utilized for supporting the load the weight of wheel required for a given load can be reduced to a minimum.

The operation of the improved wheel is as follows:

When the wheel is at rest the outer rim segments 6 are at their minimum distance from the axis of the wheel, the opposing faces of the several segments being in contact with one another. When the wheel is rotating the segments 6 tend to move outward away from the axis of the wheel under the action of centrifugal force, the links 5 moving about their pivots 4 in a clockwise direction from the position shown in Fig. 2 so that the diameter of the tread of the wheel is increased. The range of movement of the tread of the wheel relatively to its axis whereon depends the necessary resilience is thus determined by the inner and outer positions which the tread segments occupy while the wheel is at rest and rotating at full speed respectively, the outward movement of the segments increasing as the speed of rotation increases. The force exerted in an upward direction opposite to the pressure of the load on the wheel is thus dependent upon the centrifugal force exerted by the segments 6 through the pivoted links 5, and the load on the wheel is therefore resiliently and not rigidly supported. Any shock experienced by the tread of the wheel is not transmitted directly to the wheel axle but is absorbed by the inward movement of the segments 6, 7 being distributed throughout all the segments which move inward in passing over an obstacle and subsequently return to their original position.

The construction illustrated in Figs. 1 to 3 is open to the disadvantage that if the speed of rotation is increased beyond the normal speed necessary for resiliently supporting the load on the wheel the latter will not be sufficiently resilient and the running of the wheel will be too rigid. On the other hand if the speed of rotation be less than the normal speed above referred to, the wheel will be too resilient and not sufficiently rigid. It is therefore of advantage to provide arrangements for automatically maintaining the resilience of the wheel or in other words its load supporting capacity at a constant value corresponding to the actual load to be carried by the wheel and independent within considerable limits of the actual speed of rotation. This is effected in the modified construction illustrated in the Figs. 4 and 5 of the drawings in which the inner rim segments 9 are secured to the felly of the wheel in the same manner as that above described with reference to Figs. 1 and 2. The outer rim segments 11 which are provided, as before, with a resilient tread or tire 12 are pivotally mounted as indicated at 10 upon the inner rim segments 9 at one side of the center of gravity of the segments 11, the several segments engaging with one another by means of universal couplings 14 located in suitable grooves or recesses 13 in the segments 11. It will be seen from Figs. 9, 10 and 11 that each coupling piece 14 consists of a disk having parallel ribs 16 formed on one face and a number of ribs 17, perpendicular to the ribs 16, on the other face. The ribs 16 are inserted into the grooves 13 and the ribs 17 mesh with the ribs 17 of the coupling 14 in the adjacent tread section.

As shown in Fig. 5 the center of gravity of the outer rim segments 11, 12 is located on the left of the pivots 10 so that under the influence of centrifugal force each of the outer rim segments 11 tends to rotate in a clockwise direction about the pivot 10. The running surface or tread of the wheel is curved as shown in Fig. 4, the operation of this form of construction being as follows:

When the wheel is rotating each of the segments 11 assumes such a position that with a constant load on the wheel the product of the centrifugal force acting outward from the center of gravity of the rim segments 11 and the horizontal distance of the center of gravity from the pivot 10 is equal and opposite to the product of the upward pressure on the wheel rim representing the load on the wheel and the horizontal distance of the line of contact of the wheel with the ground from the pivot 10. In other words each segment is subject to the action of two opposing couples acting about the pivot 10, the position of the line of contact of the wheel with the ground being automatically altered owing to the curved contact surface of the wheel so that these two couples are in equilibrium.

As will be understood from the above description for a high speed of rotation the line of contact of the tire 12 with the ground will be toward the left (Fig. 5) and the segments 11 will reach their extreme position (see the dotted and dashed line) if their left side faces 11ª touch the butt-flange 15 of the rim 2, while as the speed of rotation is reduced the line of contact will move toward the right and when the wheel is actually stationary the position of the segments will be that shown in Fig. 4 the line of contact being vertically below the pivot 10 in which case both the opposing forces above referred to will be reduced to zero and the wheel will, consequently, become rigid and non-resilient; conversely as the speed of rotation is increased the resilience of the wheel will increase.

This construction has still the disadvantage that the load on the wheel is only resiliently supported as long as a predetermined maximum of rotational velocity is not exceeded, whereas if the speed is increased beyond such a limit that further outward rotation of the outer rim segments 11 is hindered by their touching the butt-flange 15, these segments cannot any longer play freely according to the varying load but will only exert an increasing pressure upon the butt-flange 15. As this pressure too increases with the square of the speed of rotation, the running of this wheel will likewise become too rigid if the normal speed is exceeded.

Figs. 6 and 7 illustrate a modified construction in which the outer rim segments are free to play according to the varying load at any possible speed so that the equilibrium between the load and the lifting component of the centrifugal force will be maintained also at the highest attainable speed. This is effected by increasing the angle of the lateral curvature of the tread and the permissible range of movement of the segments nearly to ninety degrees.

The outer segments are, as above, connected to each other by means of universal couplings 14 entering the recesses 13. As shown in Fig. 7 the center of gravity, when the wheel is at rest, is located nearly horizontally on the left of the pivots 10 so that the horizontal distance of the pivot 10 from the line of contact between the wheel and the ground during the outward turning of the segment tends toward zero and, at the same time, the lever arm of the load is increased to the maximum. The counteracting increase and diminution of the lever arms of the opposing forces has the effect to maintain the equilibrium or at least to act in this sense during the various accidents of driving.

It is found in practice that owing to the permissible range of movement of the component members of the improved wheel its resilience is almost equal to that of a wheel provided with a pneumatic tire and the durability of the wheel is superior to that of a wheel having a solid tire owing to the greater resilience and consequent reduction in wear on the running surface.

The invention is undoubtedly not limited to the precise constructional details above described which may be varied in many respects in order to meet particular conditions without exceeding the scope of the invention.

What I claim as my invention and desire to secure by Letters Patent is:

1. In a vehicle wheel, the combination with the felly of a circular series of yieldingly connected tread segments whose centers of gravity are located outside the plane of the felly and means for linking each segment to the felly.

2. In a vehicle wheel, the combination with the felly of a circular series of tread segments having their centers of gravity located outside the plane of the felly and being fulcrumed on axes substantially coinciding with chords of the wheel.

3. In a vehicle wheel, the combination with the felly of a circular series of tread segments which are fulcrumed on axes substantially coinciding with chords of the wheel, in positions in which their centers of gravity are located outside the plane of said axes and of means for yieldingly connecting adjacent segments.

4. In a vehicle wheel, the combination with the felly of a circular series of axes coinciding with chords of the wheel, a series of outer rim segments linked to said axes, the segments having their centers of gravity located outside the plane of the axes, outer tread surfaces on said segments which are curved eccentrically to their axes and means for yieldingly connecting adjacent segments.

5. In a vehicle wheel, the combination with the felly of a circular series of axes coinciding with chords of the wheel, a series of levers pivoted to said axes and having their centers of gravity located outside the plane of the axes each lever possessing a convexedly curved arm forming a tread segment, stops arranged in the paths of the levers and means for yieldingly connecting adjacent levers.

In testimony whereof I have signed my name to this specification in the presence of two subscribing witnesses.

FRITZ PFLEUMER.

Witnesses:
 LEO A. BERGHOLZ,
 PAUL ARRAS.

Copies of this patent may be obtained for five cents each, by addressing the "Commissioner of Patents, Washington, D. C."